United States Patent
Hertz et al.

(10) Patent No.: US 6,366,696 B1
(45) Date of Patent: Apr. 2, 2002

(54) VISUAL BAR CODE RECOGNITION METHOD

(75) Inventors: Lois H. Hertz, Atlanta; John C. Ming, Acworth, both of GA (US); Kevin K. Su, Petaluma, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/777,672

(22) Filed: Dec. 20, 1996

(51) Int. Cl.$^7$ ................................. G06K 9/00
(52) U.S. Cl. ......................... 382/183; 382/181
(58) Field of Search ................. 382/182, 183, 382/309, 181, 295, 312; 235/462, 470

(56) References Cited

U.S. PATENT DOCUMENTS

| | | | |
|---|---|---|---|
| 3,744,025 A | * 7/1973 | Bilgutay | 382/309 |
| 3,854,035 A | 12/1974 | Tyler et al. | 235/61.11 E |
| 4,027,142 A | * 5/1977 | Paup et al. | 235/379 |
| 4,044,227 A | 8/1977 | Holm et al. | 235/61.7 R |
| 4,147,295 A | * 4/1979 | Nojiri et al. | 235/470 |
| 4,192,452 A | 3/1980 | Hashimoto et al. | 235/471 |
| 4,408,344 A | * 10/1983 | McWaters et al. | 382/309 |
| 4,473,746 A | 9/1984 | Edmonds | 250/216 |
| 4,641,347 A | * 2/1987 | Clark et al. | 382/309 |
| 4,680,457 A | 7/1987 | Robertson | 235/470 |
| 4,748,317 A | * 5/1988 | Satoh | 235/462 |
| 4,806,741 A | 2/1989 | Robertson | 235/462 |
| 4,902,883 A | 2/1990 | Poland | 235/462 |
| 4,939,355 A | 7/1990 | Rando et al. | 235/467 |
| 4,958,064 A | 9/1990 | Kirkpatrick | 235/384 |
| 5,086,215 A | * 2/1992 | Carsner et al. | 235/462 |
| 5,115,888 A | 5/1992 | Schneider | 186/61 |
| 5,120,940 A | 6/1992 | Willsie | 235/462 |
| 5,194,722 A | * 3/1993 | Mergenthaler et al. | 235/470 |
| 5,247,154 A | 9/1993 | Ahmed | 219/121.83 |
| 5,276,315 A | * 1/1994 | Surka | 235/462.1 |
| 5,352,878 A | * 10/1994 | Smith et al. | 235/462 |
| 5,367,578 A | * 11/1994 | Golem et al. | 382/183 |
| 5,463,700 A | * 10/1995 | Nakazawa | 382/309 |
| 5,587,575 A | * 12/1996 | Leitner et al. | 235/462 |

* cited by examiner

*Primary Examiner*—Yon J. Couso
(74) *Attorney, Agent, or Firm*—Paul W. Martin; Priest & Goldstein, PLLC

(57) ABSTRACT

A visual bar code recognition method which combines conventional decoding techniques with optical character recognition (OCR). The visual bar code recognition method captures an image of an object containing a bar code. Regardless of the orientation of the bar code within the field-of-view, the system detects the presence of the bar code, and decodes it using the bar/space patterns. It then produces an independent decoding of the human-readable numbers printed on the bar code using OCR. From these two decodings, it determines the identity of the object. It verifies this identity by comparing the physical characteristics of the object from the image with the known features of the product.

14 Claims, 5 Drawing Sheets

VISUAL BAR CODE RECOGNITION METHOD

BACKGROUND OF THE INVENTION

The present invention relates to image processing methods and bar code scanners, and more specifically to a visual bar code recognition method.

Bar code symbols provide a fast and accurate means of representing information about an object. Decoding or reading of the bar code is accomplished by translating the patterns of bars and spaces into a unique series of numbers that correspond to a specific item. Currently, the majority of bar codes are read using laser scanners. While these laser systems work well under optimal conditions, they have some inherent disadvantages and limitations. For example, a laser scanner cannot verify that a correct bar code has been scanned by an examination of the item.

Therefore, it would be desirable to provide a visual bar code recognition method, which may be part of a visual bar code scanner.

SUMMARY OF THE INVENTION

In accordance with the teachings of the present invention, a visual bar code recognition method is provided.

The visual bar code recognition method captures a color image of an object containing a bar code. Regardless of the orientation of the bar code within the field-of-view, the system detects the presence of the bar code, and decodes it using the bar/space patterns. It then produces an independent decoding of the human-readable numbers printed on the bar code using OCR. From these two decodings, it determines the identity of the object. It verifies this identity by comparing the physical characteristics of the object from the image with the known features of the product.

The method adds a great deal of decoding flexibility not possible with a laser since a laser scanner can only perform a subset of these tasks.

As long as the bar code is within the focused field of view, the algorithms are capable of locating and decoding the bar code regardless of orientation.

Error detection and correction are provided in two ways: (a) Multiple scan lines are passed through the bar code allowing for partial decoding of several lines and recombining into a final result and (b) Optical Character Recognition (OCR) on the characters below the bar code normally used for manual entry allow for an independent decoding.

After decoding, products may be verified by comparing the known physical characteristics (color, size, shape, texture, etc.) of the decoded product with the features found in the captured image.

The method is applicable to both processing on a single frame static image (such as with a hand-held camera) or on a real-time image stream. The implementations of these ideas are different in each case but the underlying process is identical.

It is accordingly an object of the present invention to provide a visual bar code recognition method.

It is another object of the present invention to provide a visual bar code recognition method which uses a camera to capture an image of an item having a bar code.

It is another object of the present invention to provide a visual bar code recognition method which uses a camera to capture an image of an item having a bar code, and which locates and decodes the bar code.

It is another object of the present invention to provide a visual bar code recognition method which uses a camera to capture an image of an item having a bar code, and which verifies the contents of the bar code using optical character recognition (OCR).

It is another object of the present invention to provide a visual bar code recognition method which uses a camera to capture an image of an item having a bar code, and which verifies the contents of the bar code by comparing features of the item from the image with features in a product database.

It is another object of the present invention to provide a visual bar code recognition method which uses a camera to capture an image of an item having a bar code which may be static or moving.

BRIEF DESCRIPTION OF THE DRAWING

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
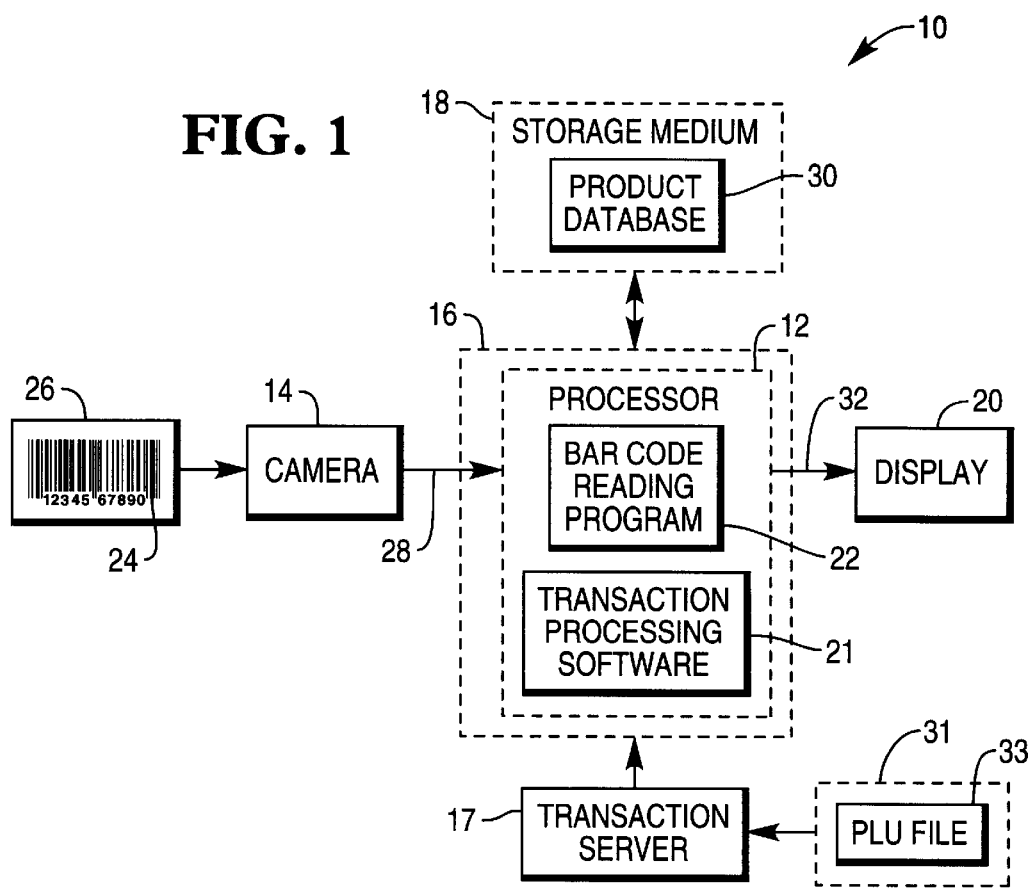
FIG. 1 is a block diagram of a visual bar code system of the present invention.

Referring now to FIG. 1, system 10 primarily includes camera 14, terminal 16, and transaction server 17.

Camera 14 produces an image 28 of bar code 24 and item 26. Preferably, image 28 is a 24-bit color image. Bar code 24 includes black and white bars and human-readable characters. Item 26 may be static or moving.

Terminal 16 includes processor 12.

Processor 12 executes transaction processing software 21 which tallies items during a transaction, including item 26. In order to obtain price information for an item, transaction processing software 21 sends a price request containing an item number obtained from bar code reading software 22 to transaction server 17.

Bar code reading software 22 locates and decodes bar code 24 and sends the item number to transaction processing software 21. Bar code reading software 22 produces decoded bar code information by analyzing image 28, by using optical character recognition of numeric characters printed with the bar code and evident in image 28, and by comparing features extracted from image 28 with features stored within product database 30.

Transaction server 17 provides item price and item descriptions from PLU file 33 in response to requests from terminal 16.

Storage medium 18 permanently stores bar code reading software 22 and contains product database 30. Product database 30 contains item features that bar code reading software 22 uses to identify item 26. Thus, only items whose features have been previously entered in product database 30 are identifiable.

Display 20 displays item price and item descriptions 32 provided by processor 12.

Storage medium 31 stores PLU file 33.

Figure 2:
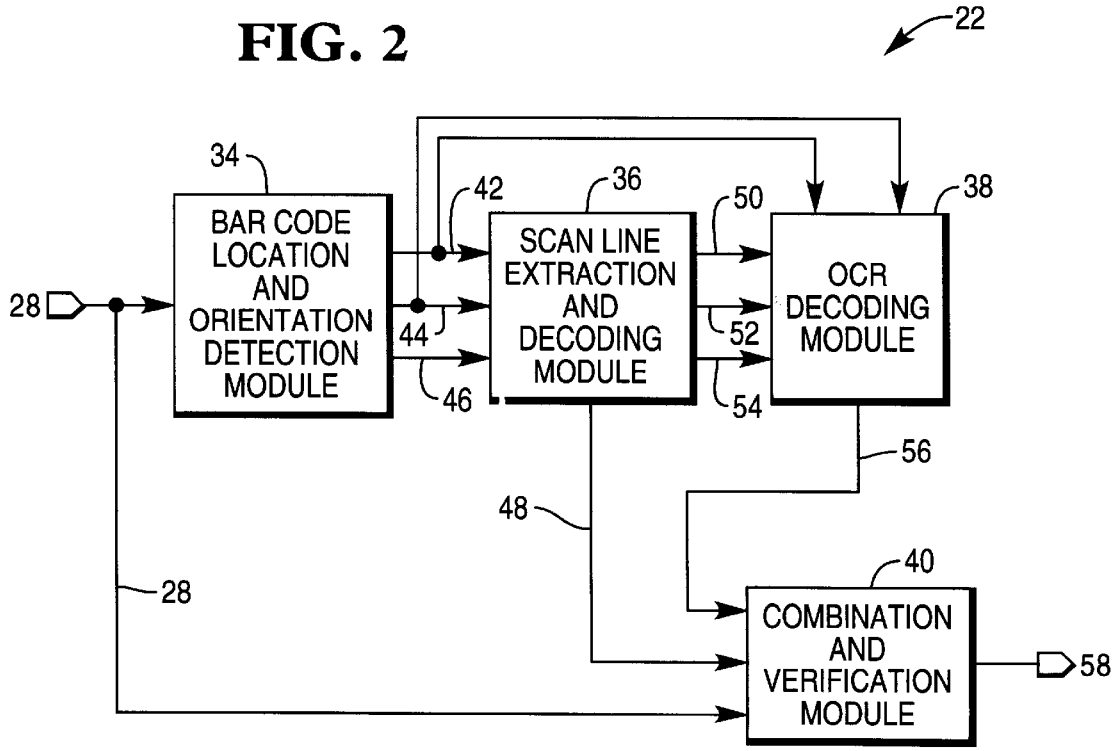
FIG. 2 is a block diagram of the bar code reading program of FIG. 1.

Turning now to FIG. 2, bar code reading software 22 includes bar code location and orientation determining module 34, scan line extraction and decoding module 36, optical character recognition (OCR) decoding module 38, and combination and verification module 40.

Bar code location and orientation determining module 34 determines the location 42 and orientation 44 of bar code 24 and produces a gray scale image 46 from color image 28. Bar code location and orientation determining module 34 utilizes the highly parallel nature of the bars within bar code 24. In an image such as image 28, the edges or boundaries of these parallel bars will themselves be parallel, pointing in a direction perpendicular to the bars. The presence of a compact set of unidirectional edges signals the possibility of a bar code. In frequency space, the predominance of a single phase of these edges filters a bar code from surrounding text and determines the orientation of the bar code. This edge-based approach to bar code location and orientation is valid in both a static image (such as one produced using a hand-held camera) or a frame from an real-time image stream.

Scan line extraction and decoding module 36 uses location 42, orientation 44, and gray scale image 46 to decode bar code 24 from its bar and space patterns and produces decoded bar code characters string 48. By-products of scan line decoding are bar code type 50, bar code direction 52, and binary image 54.

OCR decoding module 38 uses bar code type 50, bar code direction 52, and binary image 54, along with bar code location 42 and orientation 44, to extract the precise regions in image 46 that contain the human-readable characters of bar code 28 and produce decoded human-readable characters string 56.

Combination and verification module 40 produces a final decoding 58 of bar code 24 from three sources: decoded bar code characters string 48, decoded human-readable character string 56, and features in image 28.

Figure 3:
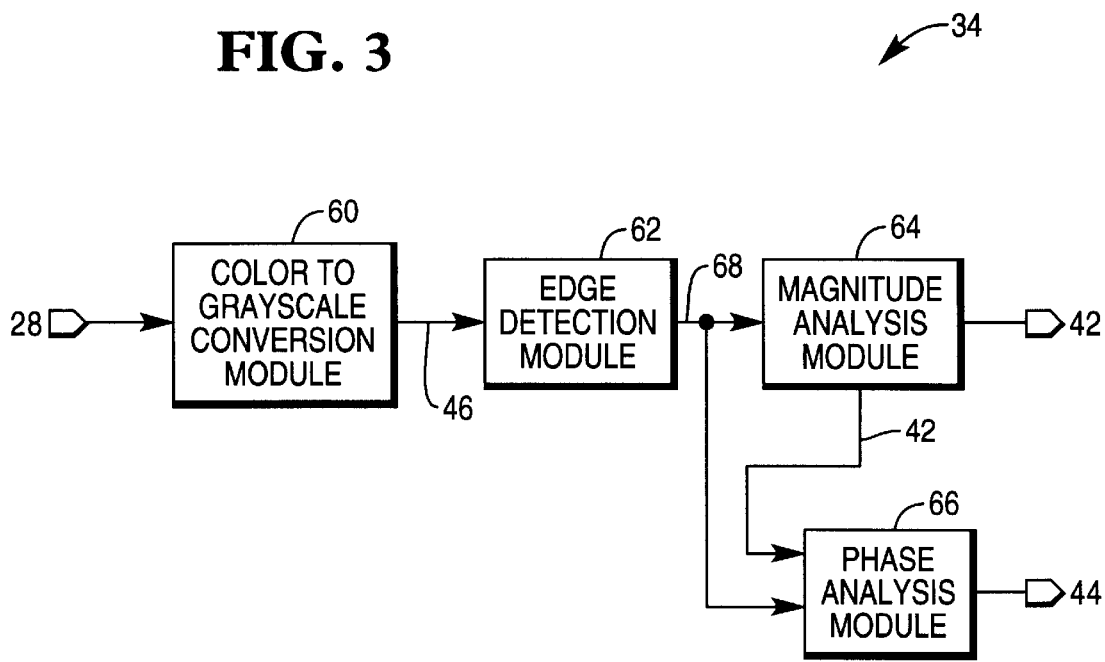
FIG. 3 is a block diagram of the bar code location and orientation module of FIG. 2.

Turning now to FIG. 3, bar code location and orientation determining module 34 includes color to gray scale conversion module 60, edge detection module 62, magnitude analysis module 64, and phase analysis module 66.

Color to gray scale conversion module 60 transforms image 28 into an 8-bit per pixel representation, which is gray scale image 46.

Edge detection module 62 applies a filter at each pixel of gray scale image 46 to produce a gray scale edge map 68 that indicates whether each point of image 46 is a member of the set of bar code edge pixels (the stronger the edge in the image, the greater the gray level in edge map 68.) The filter filters out pixels having gray scale levels below a predetermined threshold gray scale level.

Magnitude analysis module 64 analyzes edge map 68 to provide the location of bar code 24. An area of edge map 68 with a dense concentration of high strength edges indicates a region of good contrast and the likely location of bar code 24. Magnitude analysis module 64 looks for a density of pixels left from the filtering by edge detection module 62 that is greater than a predetermined threshold density. The center of the region is termed the location 42 of bar code 24.

Phase analysis module 66 employs location information 42 from magnitude analysis module 64 and edge map 68 to determine the orientation 44 of bar code 24. If the phase or direction is similar for most of the high strength edges, the region probably contains the parallel bars of bar code 24. The phase of the edges is the bar code's orientation 44.

Figure 4:
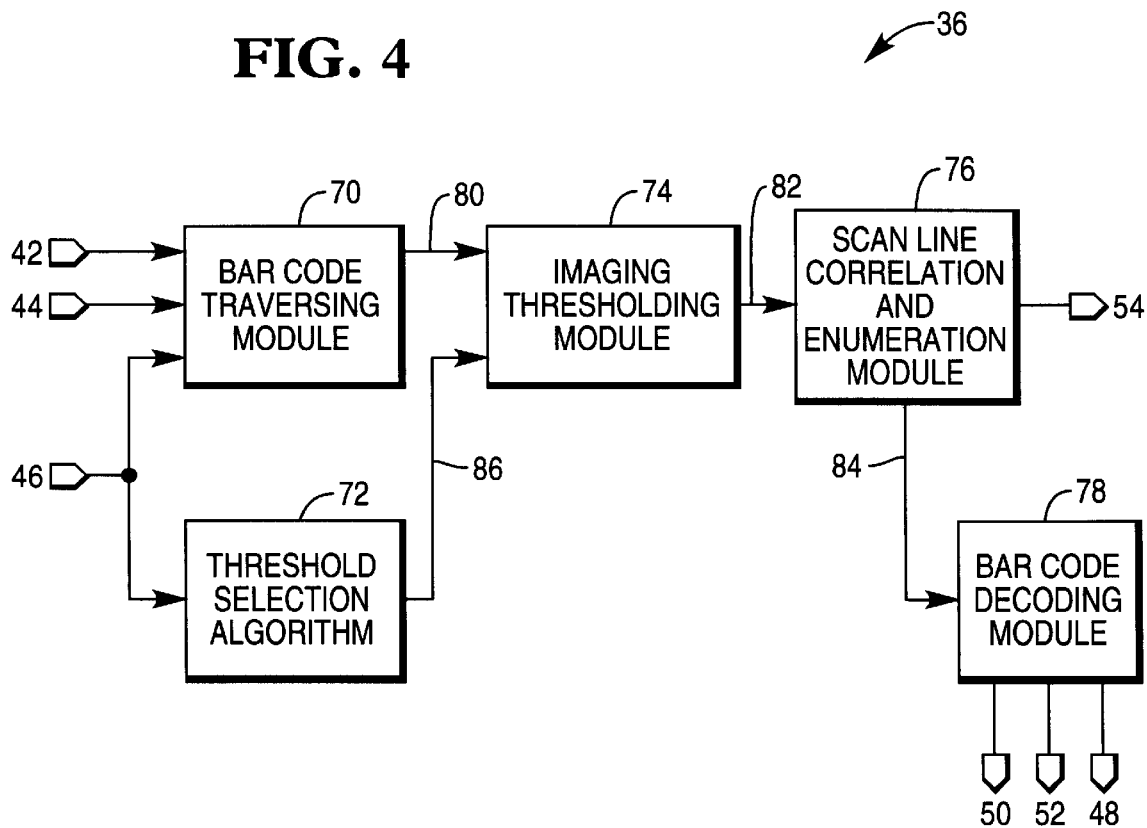
FIG. 4 is a block diagram of the scan line extraction and decoding module of FIG. 2.

Referring now to FIG. 4, scan line extraction and decoding module 36 includes bar code traversing module 70, threshold selection algorithm 72, image thresholding module 74, scan line correlation and enumeration module 76, and bar code decoding module 78.

Bar code traversing module 70 traces a series of gray scale scan lines 80 completely across the bar code 24 at the computed orientation angle 44. This bar code traversal is comprised of three steps: defining coordinates that make up a line at the given angle (with origin at (0,0)), determining starting points at both sides of the bar code (since its direction is unknown at this stage), and creating a set of scan lines 80 using each starting point (from Step 2) as an offset to the line determined in Step 1.

Due to the design of the bar code itself, it is not necessary for this angle 44 to be exact. All that is required is that each scan line 80 passes completely through the bar code 24. The coordinates in Step 1 may be computed as needed or predetermined and stored in a lookup table.

Threshold selection algorithm 72 transforms the gray scale image 46 into a binary image 54. This is accomplished by selecting a single value or threshold and mapping all pixels whose gray levels are greater than the threshold to one and all those below the threshold to zero.

The literature supports a large number of threshold selection algorithms 72 and the results of this bar code decoding method are not dependent on any particular method. Experimentally, numerical techniques appear to be preferable to statistical (histogram) methods. To allow for a margin of error when thresholding, it may be desirable to select more than one threshold (usually by varying parameters in a single thresholding scheme). The threshold used to create the binary image 54 is either the single computed value or the average of several.

Imaging thresholding module 74 transforms gray scale scan lines 80. If N thresholds are selected, the thresholded output contains N+1 levels. Therefore, the output of imaging thresholding module 74 may be of binary, ternary, or higher order.

Scan line correlation and enumeration module 76 produces a complete set of binary scan lines 84. The correlation part of this step combines groups of M adjacent lines in a effort to reduce the effects of noise and thresholding artifacts. From these combined scan lines, the enumerator portion constructs a set of binary scan lines 84 representing all possible pixel patterns.

Bar code decoding module 78 decodes each of scan lines 84 by measuring the bar/space patterns and translating them into a string 48 containing the bar code characters along with the bar code type 50 (UPC-A, UPC-E, etc.) and the bar code direction 52 (left to right or right to left).

Bar code decoding module 78 additionally verifies that each decoded string 48 satisfies the checksum requirements for a bar code. If errors are found in one portion of a scan line, bar code decoding module 78 will attempt to salvage any information possible from sections of the line. Ideally, all of the scan lines will decode to the same bar code. If not, bar code decoding module 78 then assigns probabilities to the different decodings based on the number of scan lines producing each. The algorithms developed to decode laser scanned bar codes are applicable here.

Figure 5:
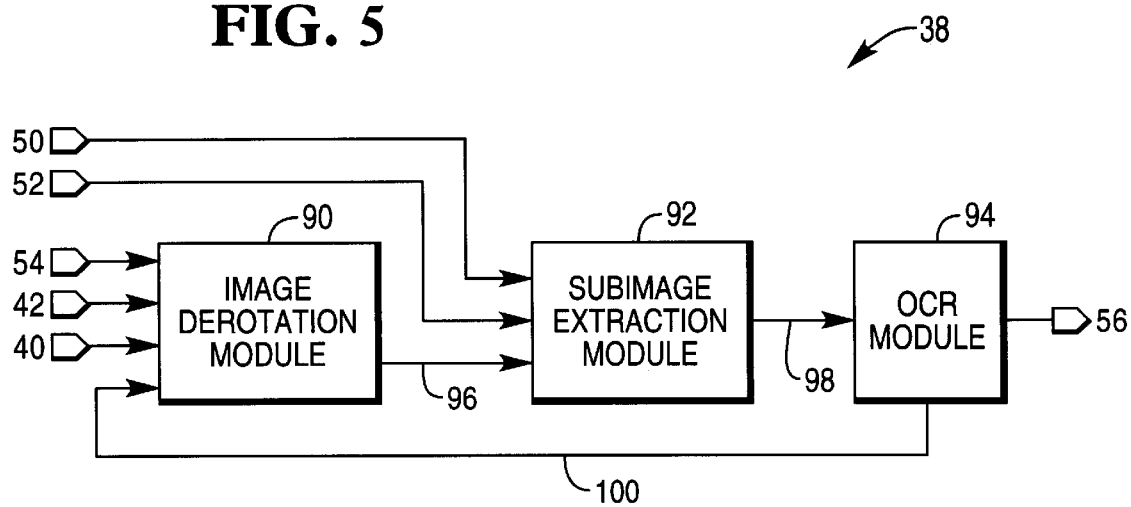
FIG. 5 is a block diagram of the optical character recognition (OCR) decoding module of FIG. 2.

With reference to FIG. 5, OCR decoding module 38 includes image derotation module 90, subimage extraction module 92, and OCR module 94.

Subimage extractor 92 appropriately locates the subimages 98 of binary image 54 that contain the printed human-readable characters. For instance, UPC-A has ten characters, separated into two groups of five, printed directly below the bars (inside the guard bars), one on the bottom left and one on the bottom right. Subimage extractor 92 places rectangles at these four locations and isolates the pixels within these boxes.

OCR module 94 then reads the characters from subimages 98, choosing only numbers as possible characters. It then combines the decodings from all subimages 98 into a single bar code string 56, again validating the checksum.

Image derotation module 90 produces a binary image 96 in which bar code 24 is guaranteed to be vertical. This is necessary if OCR module 94 cannot handle rotated text in subimages 98. Rotated subimages 100 are passed through OCR module 94 to image derotation module 90, as discussed further below.

If a single character decodes as more than one number, both selections are retained and probabilities are assigned to each. Decoding of such numbers is resolved by combination and verification module 40.

Figure 6:
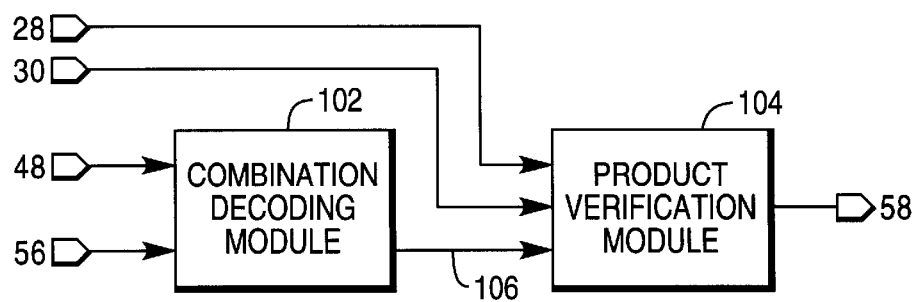
FIG. 6 is a block diagram of the combination and verification module of FIG. 2.

With reference to FIG. 6, combination and verification module 40 includes combination decoding module 102 and product verification module 104.

Combination decoding module 102 compares strings 48 and 56 to determine an estimate 106 of the identity of item 26.

Product verification module 104 compares features identified within image 28 with features stored within product database 30 to estimate the identity of item 26. Features include, but are not limited to, such attributes as shape, size, and color scheme of item packaging, and text and logos printed on the item or the item packaging.

Since both the bar code string 48 and the OCR string 56 may have a degree of uncertainty associated with each character, product verification module 104 then compares estimate 106 suggested by strings 48 and 56 with the estimate determined by product verification module 104. Uncertainty may be caused by one or more characters being undecodable using OCR decoding module 38 or by the bar/space patterns being undecodable. Therefore, it is entirely possible that neither method of modules 36 and 38 can decode bar code 24 correctly. Product verification module 104 produces the final decoding 58 of item 26 based on these probabilities. The final decoding 56 is a series of numbers that corresponds to item 26 in the product database 30.

Figure 7A:
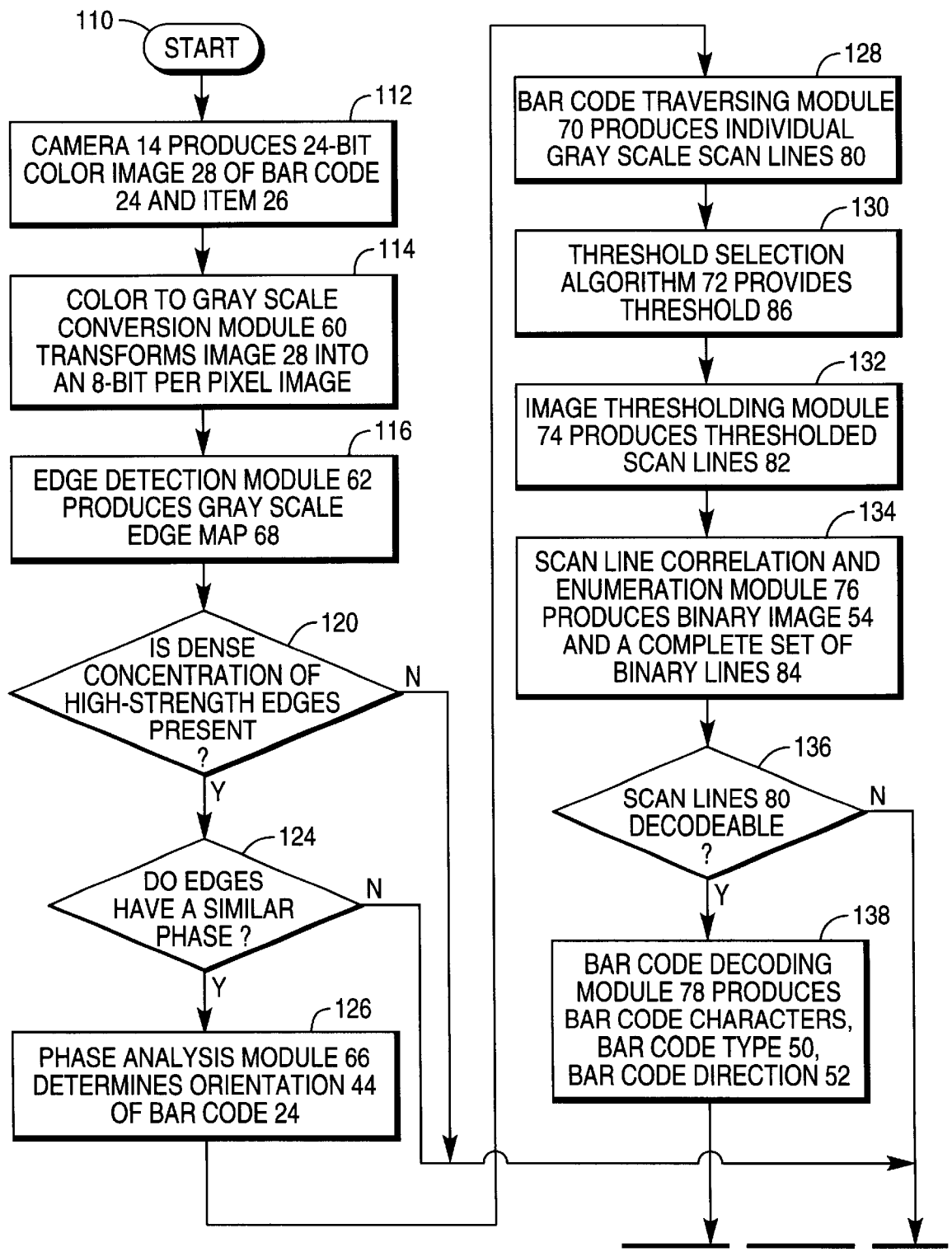
FIGS. 7A and 7B form a flow diagram of the visual bar code decoding method.
Figure 7B:
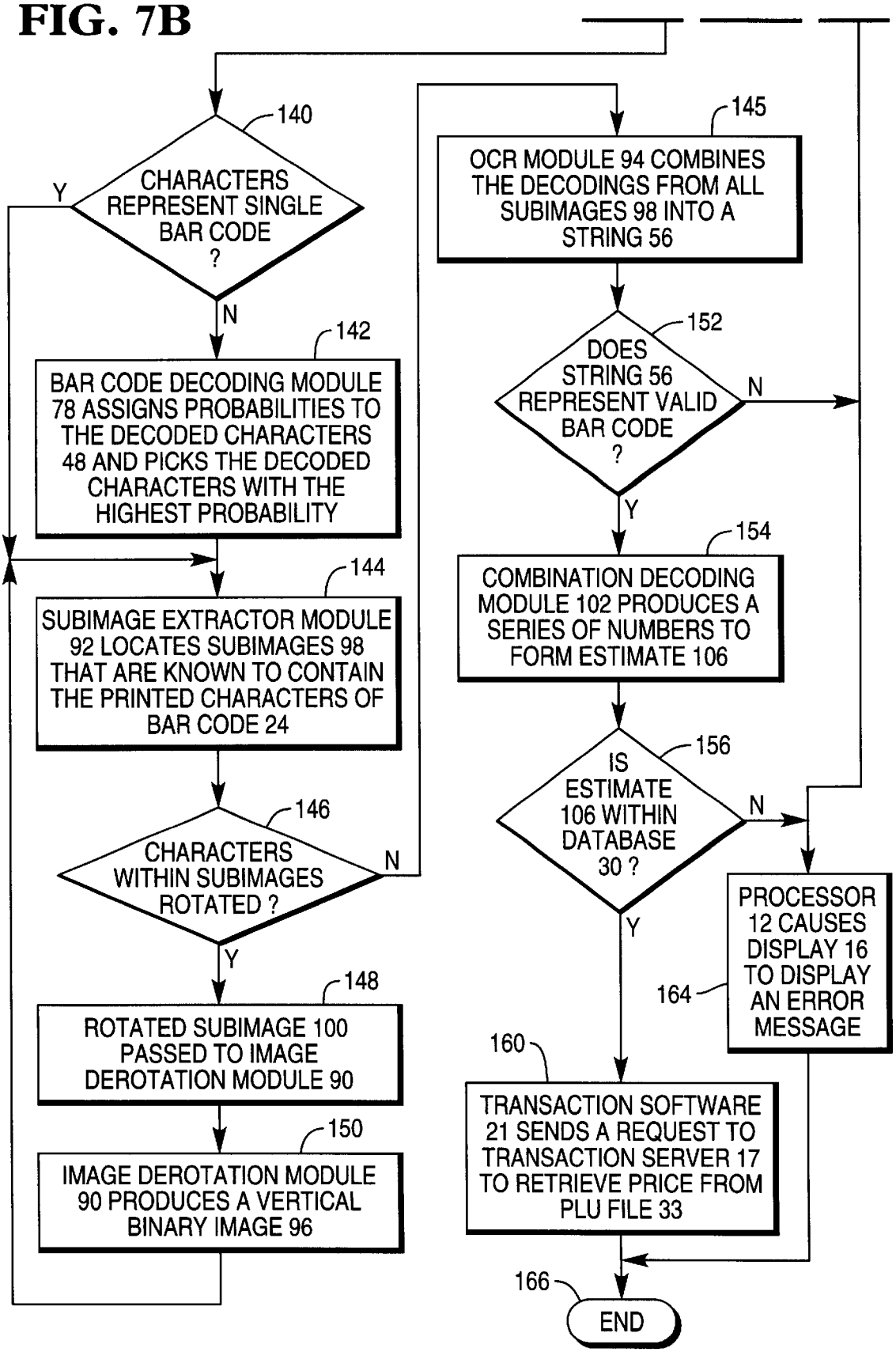

Turning now to FIGS. 7A and 7B, the method of operation of system 10 and software 22 is illustrated beginning with START 110.

In step 112, camera 14 produces 24-bit color image 28 of bar code 24 and item 26. Item 26 may be static or moving in front of camera 14.

In step 114, color to gray scale conversion module 60 transforms image 28 into an 8-bit per pixel gray scale image 46. This step decreases memory and processing power that are required to locate bar code 24.

In step 116, edge detection module 62 produces gray scale edge map 68.

In step 120, magnitude analysis module 64 attempts to locate bar code 24. If an area characterized by a dense concentration of high-strength edges is not found, then item 26 is not properly oriented or printed or does not have a bar code. The method proceeds to step 164, in which software 22 displays an error message on display 20 and the method ends in step 166.

If image 46 contains a dense concentration of high-strength edges, the method proceeds to step 124.

In step 124, phase analysis module 66 determines whether the edges have a similar phase so that the area found in step 120 may be classified as a bar code.

If not, then the area is not a bar code or bar code 24 is so poorly printed that decoding is not possible. The method proceeds to step 164, in which software 22 displays an error message on display 20 and the method ends in step 166.

If the edges have a similar phase, then the area is likely a bar code and the method proceeds to step 126.

In step 126, phase analysis module 66 determines orientation 44 of bar code 24.

In step 128, bar code traversing module 70 produces individual gray scale scan lines 80.

In step 130, threshold selection algorithm 72 provides threshold 86.

In step 132, image thresholding module 74 produces thresholded scan lines 82.

In step 134, scan line correlation and enumeration module 76 produces binary image 54 and a complete set of binary lines 84.

In step 136, bar code decoding module 78 attempts to decode binary lines 84.

If there are errors, the method proceeds to step 164, in which software 22 displays an error message on display 20 and the method ends in step 166.

If there are no errors, then the method proceeds to step 138.

In step 138, bar code decoding module 78 produces bar code characters, bar code type 50, and bar code direction 52.

In step 140, bar code decoding module 78 determines whether the characters represent a single bar code.

If so, the method proceeds to step 144.

If not, the method proceeds to step 142.

In step 142, bar code decoding module 78 assigns probabilities to the decoded characters and picks the decoded characters with the highest probabilities to form string 48.

In step 144, subimage extractor module 92 locates subimages 98 that are known to contain the printed characters of bar code 24.

In step 146, subimage extractor module 92 determines whether characters within the subimages are rotated.

If not, the method proceeds to step 145.

If so, the method proceeds to step 148.

In step 148, subimage extractor module 92 passes the rotated subimage 100 to image derotation module 90.

In step 150, image derotation module 90 produces a vertical binary image 96 and the method returns to step 144 until all of the subimages are derotated.

In step 145, OCR module 94 combines the decodings from all subimages 98 through OCR module 94 into string 56.

In step 152, OCR module 94 determines whether string 56 represents a valid bar code.

If not, the method proceeds to step 164, in which software 22 displays an error message on display 20 and the method ends in step 166.

If so, then the method proceeds to step 154.

In step 154, combination decoding module 102 compares string 48 with string 56 to produce a series of numbers to form estimate 106.

In step 156, product verification module 104 compares features identified within image 28 with features stored within product database 30 to determine whether estimate 106 is in product database 30.

If not, the method proceeds to step 164, in which software 22 displays an error message on display 20 and the method ends in step 166.

If so, then the method proceeds to step 160.

In step 160, transaction software 21 sends a request to transaction server 17 to retrieve the price of item 26 from PLU file 33. Transaction software 21 adds the item and its price to the transaction total and completes the transaction after all such items have been processed by software 22.

The method ends in step 166.

Although the present invention has been described with particular reference to certain preferred embodiments thereof, variations and modifications of the present invention can be effected within the spirit and scope of the following claims.

What in claimed is:

1. A method of decoding a bar code to identify an item having the bar code on it comprising the steps of:

capturing an image of the item;

locating the bar code label in an area of the image;

decoding the bar code label located in the area of the image to produce a first set of characters;

performing optical character recognition of the area of the image to produce a second set of characters; and comparing the first set of characters to the second set of characters to identify the item.

2. The method as recited in claim 1, further comprising the steps of:

determining predetermined features of the item from the image; and comparing the features to features stored within a database to verify the identity of the item.

3. A method of decoding a bar code on an item comprising the steps of:

providing a gray-scale image of the item;

determining gray levels of pixels within the image;

filtering out pixels having gray levels below a predetermined threshold gray level;

determining an area of the image having a density of pixels with gray levels above the predetermined threshold density to locate the bar code;

determining an orientation of the area;

tracing a plurality of gray-scale lines through the area;

transforming the image into a binary image;

transforming the gray-scale lines to binary lines;

decoding the binary lines to produce a first set of characters;

performing optical character recognition of the area to produce a second set of characters;

comparing the first set of characters to the second set of characters to identify the item;

determining predetermined features of the item from the image; and comparing the features to features stored within a database to verify the identity of the item.

4. The method of claim 1 wherein the step of capturing an image of the item is performed utilizing a camera to scan a substantial portion of the item including the bar code.

5. The method of claim 1 wherein the step of locating the bar code label further comprises the steps of determining the location of a dense concentration of high-strength edges within the image and analyzing whether said edges have a similar phase.

6. The method of claim 1 wherein the bar code has an associated human readable character string located in close proximity to a series of bars and spaces defining a coded portion of the bar code, said step of decoding the bar code label comprises a decoding of the series of bars and spaces, and said step of performing optical character recognition comprises a recognition of said associated human readable character string.

7. The method of claim 6 wherein identification of the item occurs only if the first set of characters and the second set of characters sufficiently match.

8. The method of claim 2 wherein said predetermined features correspond to physical characteristics of the item.

9. The method of claim 8 wherein identification of the item occurs only if the first set of characters and the second set of characters sufficiently match and said predetermined features sufficiently match the features stored within the database.

10. A visual recognition apparatus for decoding a bar code to identify an item, the apparatus comprising:

a camera for capturing an image of the item;

a bar code label locator for locating an area within the image including the bar code;

a decoder for decoding the bar code and to produce a first set of characters corresponding to the bar code;

an optical character recognizer for recognizing a human-readable string of characters associated with the bar code and also located in said area, and for producing a second set of characters corresponding to the human-readable string of characters; and a processor for comparing the first set of characters and the second set of characters and to identify the item if the first set of characters and the second set of characters sufficiently match.

11. The apparatus of claim 10 wherein the processor is further operable to determine predetermined features of the item from the image, and to compare the predetermined features to features stored within a database to further verify the identity of the item.

12. The apparatus of claim 10 wherein the bar code label locator further comprises an edge filter for locating an area within the image having a dense concentration of high-strength edges.

13. The apparatus of claim 12 further comprising an analyzer for analyzing whether said edges have a similar phase.

14. The apparatus of claim 11 wherein the predetermined features correspond to physical features of the item.

* * * * *